(12) United States Patent
Geppert et al.

(10) Patent No.: US 12,038,596 B2
(45) Date of Patent: Jul. 16, 2024

(54) BACKLIGHTING DEVICE

(71) Applicant: Methode Electronics Malta Ltd., Birkirkara (MT)

(72) Inventors: Michael Geppert, Bingen (DE); Elie Assy, Mainz (DE); Johann Barbara, Hauxton (GB)

(73) Assignee: Methode Electronics Malta Ltd., Birkirkara (MT)

( * ) Notice: Subject to any disclaimer, the term of this patent is extended or adjusted under 35 U.S.C. 154(b) by 0 days.

(21) Appl. No.: 18/190,347

(22) Filed: Mar. 27, 2023

(65) Prior Publication Data

US 2023/0324599 A1    Oct. 12, 2023

(30) Foreign Application Priority Data

Apr. 6, 2022    (DE) .................... 102022001177.8

(51) Int. Cl.
    *F21V 8/00*    (2006.01)
(52) U.S. Cl.
    CPC ......... *G02B 6/0078* (2013.01); *G02B 6/0048* (2013.01); *G02B 6/0073* (2013.01); *G02B 6/0088* (2013.01)
(58) Field of Classification Search
    CPC .. G02B 6/0078; G02B 6/0048; G02B 6/0073; G02B 6/0088
    See application file for complete search history.

(56) References Cited

U.S. PATENT DOCUMENTS

| | | | | |
|---|---|---|---|---|
| 2002/0158257 A1* | 10/2002 | Nei | .......................... | H01L 33/54 257/E33.059 |
| 2002/0180923 A1* | 12/2002 | Aoyagi | ............. | G02F 1/133603 349/149 |
| 2003/0123262 A1* | 7/2003 | Suehiro | ................. | F21S 43/245 362/555 |
| 2006/0006777 A1* | 1/2006 | Lo | ........................ | G02B 6/0068 313/113 |
| 2007/0008457 A1* | 1/2007 | Takahashi | ............ | G02B 6/0018 349/64 |
| 2011/0164202 A1* | 7/2011 | Shiraishi | .............. | G02B 6/0083 349/62 |
| 2011/0299298 A1* | 12/2011 | Liang | ...................... | G02B 6/008 362/613 |
| 2012/0092584 A1* | 4/2012 | Jung | ...................... | G02B 6/009 349/58 |
| 2012/0169969 A1* | 7/2012 | Liu | ...................... | G02B 6/0021 362/613 |
| 2014/0168573 A1* | 6/2014 | Park | ..................... | G02B 6/0091 349/62 |
| 2018/0246378 A1* | 8/2018 | Lee | .................. | G02F 1/133603 |
| 2023/0077124 A1 | 3/2023 | Edwila et al. | | |

\* cited by examiner

*Primary Examiner* — Mary Ellen Bowman
(74) *Attorney, Agent, or Firm* — Greenberg Traurig, LLP

(57) ABSTRACT

The invention refers to a backlighting device for a (1) lighting assembly of a vehicle. The backlighting device comprises at least one printed circuit board and at least one light guide body. The light guide body receives the light, emitted by a light source. The printed circuit board blocks and deflects the light emitted by the light source to the light guide body. The printed circuit board has at least one opening to receive the light guide body.

22 Claims, 3 Drawing Sheets

BACKLIGHTING DEVICE

RELATED APPLICATION DATA

This application claims priority benefit to German Patent Application Serial No. 10 2022 001 177.8, filed Apr. 6, 2022, the disclosure of which is incorporated by reference herein.

DESCRIPTION

The invention refers to a backlighting device for a lighting assembly of a vehicle, which may be provided on the inside or on the exterior of the vehicle. The backlighting device comprises at least one printed circuit board and at least one light guide body. The light guide body receives the light, emitted by a light source. The printed circuit board blocks the light emitted by the light source so that it is deflected to the light guide body. The printed circuit board has at least one opening to receive the light guide body.

Lighting Assembly

According to the invention, the lighting assembly is designed to illuminate the at least one surface of a vehicle, at least one surface in a vehicle and/or at least one surface on the exterior of a vehicle when a certain action has been performed by the driver of the vehicle and/or when an action is performed outside the vehicle and/or a change in the environment outside of the vehicle takes place. Such a change may be for example a person, animal, or an object entering the vicinity of the vehicle, or a change in weather or surroundings of a vehicle. The action performed in the vehicle may refer for example to opening the glove box or the storage compartment of the vehicle or actions regarding the operation of the vehicle. It goes without saying that other actions may be relevant as well.

The backlighting device may thus be used as a functional lighting assembly but may also be used for ambient illumination in and/or on the outside a vehicle.

As used herein, vehicle is a means of transport on land or on water or in the air. By way of example, but not exclusively, the invention is explained in more detail below with reference to a passenger car. Thus, the backlit surface faces towards the interior of the car.

The lighting assembly may also fulfil a safety function for the benefit of the driver. It may switch on automatically, e.g. if a safety system of the car detects signs of driver fatigue. The lighting assembly may also light up when the car has reached a certain speed.

Light scenarios generated by the lighting assembly become visible to the driver or the passngers inside the vehicle.

The lighting assembly may also be provided on the outside surfaces of a vehicle, for example on the grille of a vehicle.

The backlighting device is used to illuminate in particular at least one backlit surface of the lighting assembly inside the vehicle.

The backlighting device is referred to in more detail below.

The backlit surface of the lighting assembly can be for example an area of a door of the car. It can also be an area of the centre console of the car. The backlit surface may also be at least a portion of the roofliner of the car. The backlit surface can be any surface inside the car.

Light scenarios generated by the lighting assembly become visible to the driver inside the car. Within a light scenario of the lighting assembly, individual lights or the car's interior lighting can dim up or dim down even until the lights are eventually switched off completely.

The lighting assembly backlights at least one surface inside the car. At least partially, the surface may comprise wood or metal or leather. It goes without saying that other materials can also be used.

At least one thin layer of a material may be placed on the surface. Such a material my be wood, synthetic material, polymer, metal or leather may be placed on the surface to be illuminated. The surface can also be an imitation wood. The surface may also comprise an opaque material. Also, the material layer can be covered by an opaque layer. The material by also be diffuse. Any material known in the state of the art may be used. The layer may be coloured or dyed to create a uniform appearance of the emitted light. It may also be possible to provide a diffusor in the layer in order to create a uniform appearance of the emitted light.

The layer may be solid or may have perforations in order to let light pass through the material. The perforation may comprise holes or slits.

The perforation is backlit and/or transilluminated by means of the backlighting device.

At least one perforation may be laser etched or etched into an opaque material of the surface. The light that backlights the material passes through the perforation made in the material.

The layer can also be a transparent layer. The material may also be a diffuse or opaque.

The material layer can be applied to a carrier layer.

The material layer may have any thickness values. The material layer has a thickness of preferably 0.5 mm, most preferably 0.6 mm.

Backlit surfaces of a lighting scenario of the lighting assembly can be illuminated and extinguished regardless of the location in the vehicle and regardless of the time.

Surfaces can light up and go out one after the other, creating a moving trail of light for the viewer. The backlit trail may move continuously in the direction of travel or against the direction of travel of the car.

Alternatively, at least one side surface of a door facing towards the interior of the car can be backlit signalling that there is a person in a surveilled area outside of the car.

The lighting assembly may interact with at least one camera and/or sensor of the car, in particular in the inside or on the outside of a car.

The lighting assembly preferably illuminates function units and/or function groups of the car.

Illuminated function units and/or function groups may by part of the dashboard of the car. The illuminated function unit and/or function group may be a display or an instrument panel.

The dashboard may also comprise illuminated gauges and/or control levers to operate and to control the car.

The lighting assembly may also illuminate the footwell or the door handles in the interior of the car.

The lighting assembly may also be designed to automatically switch off or dim when the driving lights are switched on.

This way, the lighting assembly may, for example, continuously signal to the driver the position of a car he is overtaking or that is overtaking him and/or persons or animals in the vicinity of the car.

The lighting assembly may be designed as a flat or a segmented ambient lighting assembly.

The lighting assembly may be equipped with static and/or dynamic lighting scenarios. The lighting scenario may be dynamic and/or irregular and/or homogeneous.

The lighting assembly may be located in a casing which will be discussed in detail below.

The preceding list is only exemplary and is not meant to be comprehensive. It goes without saying that the lighting assembly can be used for other applications and uses not mentioned above.

Backlighting Device

According to the invention, the backlighting device illuminates a surface of the lighting assembly from behind.

The backlighting device of the lighting assembly comprises at least one one printed circuit board and at least one light source. There may also be at least one front panel and/or one frame and/or at least one diffuser foil and/or at least one casing. The components may also comprise a printed circuit board. At least one light guide body providing a light emitting surface may be another component of the backlighting device.

The individual components of the backlighting device of the lighting assembly will be referred to in more detail below.

The backlighting device provides a form of illumination which preferably, but not exclusively, uses liquid crystal displays (LCDs) and/or LEDs.

The backlighting device can also be installed in displays of different technical design. It may also act as a display with low resolution.

In the invention the backlighting device is used to illuminate preferably operating symbols and/or display symbols from behind.

The backlit surface can be a surface of a door of the car. It can be an area of the centre console of the car. The backlit surface may also be at least a portion of the roofliner of the car. Generally speaking, the backlit surface can be any surface inside the car.

To illuminate the surface of the interior of the car and/or operating symbols and/or display symbols from behind, the backlighting device is arranged behind a front panel of the surface.

The backlighting device can be positioned within a casing.

To operate the backlighting device for illuminating areas of the interior of the car from behind the invention provides a printed circuit board.

The backlighting device also comprises at least one light guide body.

The backlighting device may further comprise a frame.

The frame, the light source as well as the printed circuit board and the light guide body are referred to in more detail below.

The backlighting device of the lighting assembly backlights at least one area and/or one décor inside the car. Also, areas of the car's cockpit may be backlit.

The surface can have any shape or structure. The backlit surface may have a round (substantially cicular or elliptical) shape or a polygonal shape. It can also have a hexagonal shape. In principle, the backlit surface can take any geometric shape.

The backlighting device may be functionally controllable.

In the following the light, used for backlighting at least part of the interior of the car is referred to as a LED.

Depending on the at least one LED used to backlight the material layer, the material layer can take on the appearance of wood or metal or leather or any other material.

The LED will be referred to in more detail below.

Components of the Backlighting Device

The backlighting device comprises at least one light source and/or at least one printed circuit board. The backlighting device may also comprise at least one light guide body and/or at least one surface. The surface may be reflective, matte, opaque or diffuse. The backlighting device may further comprise a diffusor foil and/or at least one frame and/or at least one casing.

In the following, components of the backlighting device are explained referring to individual components of the backlighting device.

The backlighting device may be arranged in a casing behind a front panel of a casing.

The backlighting device comprises one or more light sources. In the present example the light sources are arranged below the printed circuit board (PCB). The light source may also be arranged on top or on the side of the printed circuit board.

A printed circuit board carries a plurality of light guide bodies. The light guide bodies are arranged between the light sources and the front panel and the frame.

A light guide body emits the light received from the light source through a light emitting surface.

The light emitted through the light emitting surface is transferred to the front panel may pass through a diffuser foil.

According to the invention, it is possible to provide a backlighting device comprising one printed circuit board and/or light guide body and/or light sources, or comprising a plurality of printed circuit boards and/or light guide bodies and/or light sources a of the same and of different numbers can be connected to each other.

In the following the components of the backlighting device are discussed in detail.

Casing

A casing of the backlighting device of the lighting assembly houses at least two of all components required for the operation of the backlighting device.

The casing protects the backlighting device as such and/or its components from mechanical damage.

The casing also protects the backlighting device from ingress of solid or liquid contamination.

Also, the casing protects the backlighting device from the influence of radiation.

It goes without saying that the casing may also fulfil other functions.

To operate the backlighting device of the lighting assembly, the casing comprises at least one touch control element and/or one haptic control element.

The casing houses electrical and/or electronic components required for the operation of the backlighting device.

To facilitate the operation of the backlighting device, the casing has at least one operating symbol. Also, the casing comprises at least one display symbol to show the user possible operation alternatives available to him at a certain moment.

The casing carries a front panel that closes an insertion opening of the casing.

A backlighting device is arranged behind the front panel.

The front panel is referred to in more details below.

Light Source

To generate the light for backlighing an area in the interior of the car a light source emits radiation.

It goes without saying that there are various sources of light available, such as a laser, a light bulb and/or a LED. For reasons of simplification, in the following the invention refers to one or more LEDs as light source.

At least one light source is provided in a light guide body. The light source, preferably an LED, may be provided as a socalled side LED and/or as a socalled top LED with a reflector, either positioned underneath the iluminted area or adjacent to the illuminated area. The at least one light source may be provided in different sizes and variable spacing. The light emitted by the light source is blocked by the printed circuit board from spreading preferably at an angle, most preferably in a substantially perpendicular manner in the direction to the printed circuit board. The light is deflected and guided by the printed circuit board and the light emitted by the light source is guided and deflected laterally into a light guide body.

Within the light guide body, preferably at least one geometric structure redirects the light emitted by the light source from the lateral direction back into a perpendicular direction, relative to the light source.

In other words, preferably the printed circuit board, but also other components of the backlighting device, directs the light emitted by the light source preferably at an angle into the light guide body. Inside the light guide body, at least one geometric structure redirects the emitted light at an angle, most preferably in a substantially perpendicular direction that extends from the geometric structure towards the front panel.

In a preferred embodiment of the invention, the light source may be fitted into a corner of the printed circuit board, wherein the printed circuit board has a polygonal shape, such as for example hexagonal shape. As will be shown below, the printed circuit board may have any other shape.

The light used for backlighting the surface can have any colour. It can be illuminated permanently or at intervals.

Printed Circuit Board

The backlighting device comprises at least one, preferably at least two, printed circuit boards.

The printed circuit board may be also referred to as PCB.

The printed circuit board is used for physically carrying the electronic components to operate the backlighting device of the lighting assembly.

The printed circuit board carries at least one light source.

The printed circuit board is designed as a carrier for receiving at least one light guide body. However, the at least one light guide body may rest on any other component of the backlighting device.

The printed circuit board and the light guide body have corresponding shapes for receiving the light guide body in the printed circuit board.

The printed circuit board may also be designed to run around the light guide body.

Alternatively, the printed circuit board can be arranged on at least one side of the light guide body and be connected to the light guide body.

The printed circuit board may have a polygonal or round (substantially circular or elliptical) shape. However, the shape of the printed circuit board is not limited to such a shape. The printed circuit board may habe any other shape. Most preferably, the printed circuit board has a hexagonal shape.

In one embiment of the invention, at least two printed circuit boards are positioned adjacent and are connected to each other.

Perferably, in the center of the printed circuit board at least one opening is arranged to receive the light guide body. The opening may also be arranged in any other position within the printed circuit board. The at least one light guide body is inserted into the at least one opening of the printed circuit board.

The opening provided in the printed circuit board reduces the weight of the lighting assembly.

The printed circuit board transfers the light emitted by the light source into the light guide body.

The light source may be designed as a socalled side LED.

The printed circuit board blocks the light emitted by the light source (LED) from spreading vertical upwards.

The LED may be arranged as a socalled top LED. The top LED is located on one of the two upper sides (top side) of the PCB with an additional reflector to block the light emitted and to guide it into the light guide body.

In the following the invention is explained wherein above the light source (LED) the printed circuit board is arranged.

In the position where the LED is placed on the upper side (top side) of the PCB facing away from the front panel of the casig, the printed circuit board blocks the light emitted by the light source (LED) from spreading in the direction towards the printed circuit board.

Blocked by the printed circuit board, the light emitted from the light source (LED) is deflected into the light guide body.

Due to the position of the printed circuit board relative to the light source, the printed circuit board acts like a shielding element.

The shielding element in form of the printed circuit board blocks the light emitted by the light source from being spreaded upwards towards the light emitting surface of the light guide body and/or towards the diffuser foil and/or towards the front panel.

The light emitted by the light source is blocked by the shielding element in form of the printed circuit board and thus guided into the light guide body.

In other words, the printed circuit board blocks the light emitted by the light source and defelcts it to the side, into the light guide body.

The printed circuit board may be made of a flame retardant material.

Further, the printed circuit board can be formed as a plastic substrate. The printed circuit board may be a flexible structure. Alternatively, the printed circuit board may be a foil.

The PCB may also be a rigid structure.

To manufacture the printed circuit board, in one embodiment of the the invention, MID technology (moulded interconnected device) may be used, wherein, the printed circuit board is manufactured by using a socalled MID process. This way, e.g. a conductor track of the printed circuit board can be mounted directly onto the printed circuit board. It goes without saying that the printed circuit board can also be manufactured in a different manner.

The printed circuit board may have any thickness or dimension. The thickness of the printed circuit board may be reduced to minimize a required installation space for the backlighting device.

Alternatively, in another embodiment of the invention, the printed circuit board may serve as a frame, which is used to spatially combine the components of the backlighting device.

Light Guide Body

The light guide body may be positioned between the at least one light source and the front panel of the backlighting device.

The light guide body may have any shape. Preferably, the shape of the light guide body corresponds to the shape of the printed circuit board. However, the light guide body may have a shape different from the shape of the printed circuit board. In one embodiment of the invention, the light guide body preferably has a cross section of a preferably hexagonal shape. It goes without saying that the light guide body may also have a different geometric shape. In other embodiments, the light guide body may also have for example an elongated hexagonal shape.

Like the printed cicuit board, the light guide is not limited in size. By way of example, in one embodiment of the invention, a hexagonal shape of a light guide body can have edge lengths, preferably ranging between 5 mm and 30 mm, where the hexagonal shape of the light guide body fitting into the corresponding opening of the printed circuit board preferably has an edge length of 15 mm. In another embodiment of the invention, the hexagonal shape of the light guide body may have an edge length of 22 mm.

The light guide body may be made of any material known in the art. The light guide body may, for example, be made of a stiff, for example plastic or polymer material or metal, or of a flexible material, for example silicone. The light guide body may be designed as a transparent, diffuse, opaque component. The light guide body may comprise fibres, such as glass fibre.

The light guide body may also be a tube or a rod which transports light over a predefined distance.

According to the invention, there could be provided only one or at least two light guide bodies connected together. It goes without saying that more than two i.e. any number of light guide bodies may be conntected to at least one other light guide bodies.

The light guide body may be positioned above, in the middle or, below the printed circuit board.

Inside the light guide body at least one geometric structure redirects the light, emitted by the light source into the light guide body, in a perpendicular direction that extends from the geometric structure towards the front panel of the light guide body.

The geometric structure may be an integral part of the light guide body.

By way of example, the geometric structure may be milled out of the light guide body. The geometric structure may also be created by brushing and/or by sanding and/or by sawing. It goes without saying that the geometric structure may also be created in various other technical ways.

The geometric structure may comprise edges and/or waves and/or other geometric contours.

The redirection of the light within the light guide body may also be achieved by a total reflection of the light, due to a lower refractive index of a medium surrounding the light guide body.

By way of example the medium surrounding the light guide body having a lower refractive index may be an optical thin-film material applied to the light guide body. The thin-film material may be a magnesium fluoride or a calcium fluoride or a silicon dioxide. It goes without saying that the medium surrounding the light guide body having a lower refractive index may also be produced in another technical way. The surrounding medium may also be the surrounding air.

The redirection of the light in relation to the light guide body can also be achieved by a reflection on the light emitting surface of the light guide body.

At least one light guide body is located between the at least one light source and the front plate of the backlight. The light source is located below the printed circuit board (PCB).

Each light guide body is designed for receiving and redirecting the light emitted by the light source and directed into the light guide body by the printed circuit board.

The light source that emits the light is coupled to the light guide body. After being redirected within the light guide body, the light is emitted to the interior of the car via the light emitting surface of the light guide body. The light emitting surface of the light guide body is covered by the front panel.

The light emitting surface of the light guide body is refered to in more detail below.

On its way from the light emitting surface of the light guide body to the interior of the car, the redirected light passes through the front panel of the backlighting device.

The front panel of the backlighting device facing the interior of the car may carry a diffuser foil. Alternatively, the diffuser foil may also be arranged on the side of the front panel facing the casing.

The diffuser foil is referred to in more detail below.

Inside the backlighting device the light guide body is arranged adjacent to the PCB. The light guide body may be arranged individually. Alternatively, a group of at least two light guide bodies may be arranged inside the backlighting device.

The at least two light guide bodies may be interconnected with each other by means of at least one web or by means of at least one thin skin.

Both the web and the skin may be made of a silicone material or of plastic.

The web interconnecting two light guide bodies comprises light-conducting threads. The threads are divided into longitudinal and transverse threads. The longitudinal threads cross the transverse threads. The longitudinal threads are connected to the transverse threads.

The skin interconnecting two light guide bodies is manufactured of light guiding material. The skin may consist of at least one layer of light guiding material. The layers of light guiding material may be rigid or flexible.

The light guide body is evenly illuminated. The light guide body may also be illuminated to different degrees in different areas.

The light guide body may have a shape of a hexagonal shape. At least two individual light guide bodies may be combined and/or connected to form an assembly of several light guide bodies.

The light guide body can be made of a hard or a soft plastic. The light guide body may comprise a silicone material and be flexible. The light guide body can be designed as an elastic body.

The light guide body may provide at least one overlapping area. The overlapping area illuminates preferably dark fields in the light scenario of the lighting assembly provided by a frame.

The overlapping area of the light guide body bridges the frame to illuminate shadowed areas or dark spots in the light scenario of the lighting assembly.

The overlapping area of the light guide body may overlap the printed circuit board. The light guide body may comprise further overlapping areas.

The overlapping area of the light guide body may illuminate a segment of a printed ciruit board, wherein the printed ciruit board extends between two adjacent light guide bodies. Generally speaking, the overlapping area of the light guide body may bridge and illuminate distances between two or more light guide bodies.

The distance between different light guide bodies is not limited to a specific distance. In one embodiment of the invention, the distance can range from 2 mm to 10 mm. Preferably the distance is 2 mm to 3 mm. There can also be substantially no space between different light guide bodies. The distance between different light guide bodies may have any dimension.

According to the invention, it is also possible to provice unilluminated areas or barely illuminated areas arranged between the light guide bodies or to to illuminate unilimiated or bayerly illuminated areas by overlapping areas of the light guide bodies. Thus, either no, small or no unilumiated or barely illuminated areas may be provided between the light guide bodies.

In one one embodiment of the invention, at least two light guide bodies are connected to each other by at least one web. The web may also be covered by the overlapping area of the light guide body.

Light Emitting Surface of the Light Guide Body

The light emited by the at least one light source into the light guide body is redirected towards a light emitting surface of the light guide body.

The light emitting surface of the light guide body is the surface of the light guide body through which the light exits the light guide body.

In other words, the light guide body emits the light received from the light source through its light emitting surface into the interior of the vehicle.

The light emitting surface may have any shape, size and spacing. The light emitting surface can take on any geometric shape. The light emitting surface can have a rectangular or square shape. The light emitting surface may also have a triangular or a hexagonal shape.

In a preferred embodiment of thte invention, the shape of the light-emitting surface corresponds to the shape of the light guide body.

In another embodiment of the invention, a coating and/or a foil may be applied onto the light emitting surface of the light guide body.

The light emitting surface of the light guide body is covered by the front panel.

Frame

The backlighting device may comprise a frame.

A frame may be arranged when parts of the backlit surface are to have lighting effects, such as darkened areas and/or shadows and/or dark spots.

It is possible to provide a backlighting device without a frame.

The frame may provide structure to the backlighting device. The frame may also be used to limit or direct a light fall-off. The effect where the light becomes weaker on one side of the light cone is referred to as the light fall-off.

Also, the frame may be used to influence the leading of the light on the backlit surface within the vehicle. The illumination of the backlit surface may be influenced with the help of the lealding of the light.

To create the desired lighting effects and to influence the illumination by the light, the frame may be arranged at a position in relation to the at least one light source.

Alternatively, the frame may block the light emitted from the light source.

The frame may extend all the way around the light guide body. Alternatively, the frame can be arranged on at least one side of the light guide body.

In case where the backlight device has more than one light guide body, the frame may be arranged between the different light guide bodies. The frame may also be arranged to link the at least two light guide bodies with each other.

Preferably, the frame is arranged above the PCB whereas the light source is positioned below the PCB.

The frame may also be positioned between two or more of the light sources.

The frame can be made in one piece. The frame can also be composed of several parts.

At least in some areas the frame can be translucent, diffuse or opaque. Also, at least partially the frame may be made of reflective material.

The frame may have the same hight as the light guide body or may have a hight different from the hight of the light guide body.

Diffuser Foil

The diffuser foil can be arranged to cover the light emitting surface of the light guide body.

The light exiting the light guide body of the backlighting device into the interior of the vehicle passes through the diffuser foil arranged on the light emitting surface of the light guide body.

The diffuser foil may be manufactured from various materials.

The diffuser foil may have a covering lacquer layer. The invention understands the lacquer layer to be a shiny coating finish applied to the light guide body. By way of example, the lacquer layer may be coloured. With the help of the lacquer layer, the light exiting through the diffuser foil may receive a predetermined colour shade. Instead of a lacquer layer, other materials may also be applied to the light emitting surface of the light guide body. By way of example, the diffuser foil may carry a covering paint layer.

Alternatively, the diffuser foil may comprise a variety of layers of different materials. The material may be selected of synthetic materials.

It goes without saying that the diffuser foil may also be a laminate comprising at least two individual foils.

The diffuser foil may be placed on the light emitting body to soften the light exiting the light emitting surface of the light emitting body.

The diffuser foil arranged on the light emitting surface of the light guide body may cause the light exiting through the light guide body to blur. The foil causes the transitions between areas illuminated by the light source and areas that are for example shaded by the frame to blur.

At least one segment of the front panel may carry a diffuser foil. The front panel is referred in more detail below.

Front Panel

The front panel carries an operating and/or a display symbol. The front panel closes the insertion opening of the casing.

Thus, the front panel represents the outer surface of the backlighting device of the car through which the emitted light passes out into the interior of the car.

Inside the casing which is closed by the front panel the light emitting surface is arranged on the light guide body.

The front panel may comprise any material used to cover the surface of the car component to be backlit. It goes without saying that the front panel can be a foil or a thin layer.

In order to let the emitted light shine through, the front panel can be perforated.

The front panel may comprise at least one light transmitting base material. The light transmitting base material may generate a clear light or a diffuse light. The invention understands the diffuse light to describe a soft light that illuminates a scene evenly and with little contrast or shadow.

The front panel may carry a painted coating or it may be processed by a laser.

Alternatively, the front panel may carry a decorated film which can be manufactured by a socalled in mould decoration (IMD).

In another alternative, the front panel carries a decorative layer. The decorative layer may be manufactured by means of a colour transfer. The colour transfer may be achieved by a socalled in mould labelling (IML).

Also, the decorative layer of the front panel may comprise organic and/or naturally occurring materials. The naturally occurring material of the front panel may be wood or leather. The front panel may also comprise a metal.

A coating and/or decorative layer applied to the front panel may prevent the occurrence of hot spots on the front panel. For this purpose, the coating and/or decorative layer may consist of heat-reflecting materials.

DESCRIPTION OF THE DRAWINGS

Further advantages and preferable embodiments are shown in the drawings.

DETAILED DESCRIPTION

Figure 1:
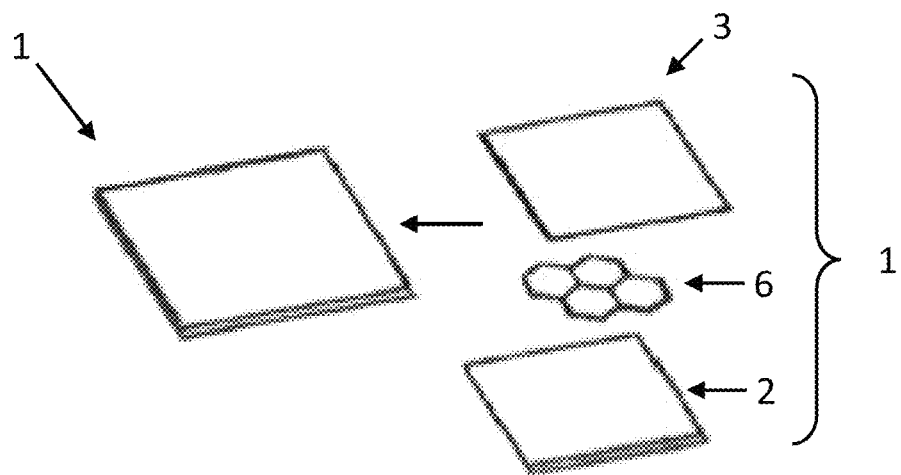
FIG. 1 shows the backlighting device of a functional lighting assembly according to one embodiment of the invention.

FIG. 1 shows a functional lighting assembly 1 as well as an exploded view of components of the lighting assembly 1 according to one embodiment of the invention. On the right, from top to bottom, FIG. 1 shows a diffuser foil 3, below which a backlighting device 6 is arranged. Below the backlighting device 6 a casing 2 is shown.

The components of the functional lighting assembly 1 comprising the casing 2, the backlighting device 6 and the diffuser foil 3 are shown on the left in FIG. 1 in an assembled state.

Figure 2:
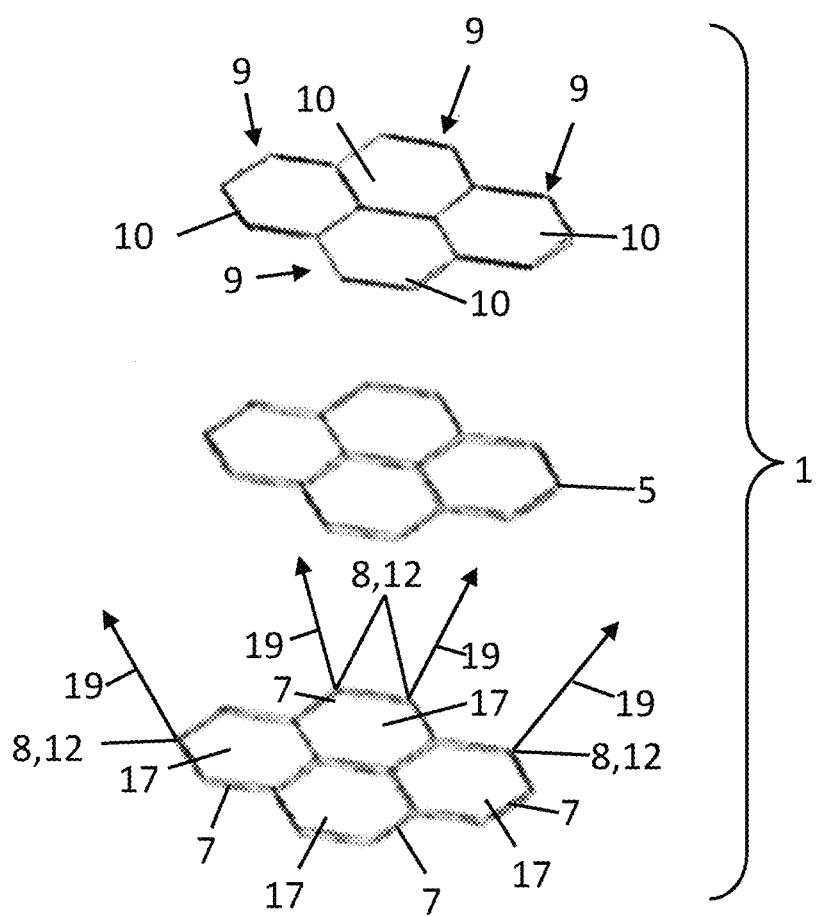
FIG. 2 shows individual components of a backlighting device according to another embodiment of the invention.

FIG. 2 shows a lighting assembly 1, comprising light guide bodies 9. Below the light guide bodies 9 there is a frame 5. Underneath the frame 5 one can see the outer boundary of printed circuit boards 7. In the embodiment of the invention shown in FIG. 2 the outer boundary of the printed circuit boards corresponds to that of the light guide bodies. However, the geometry of the light guide body and the printed ciruit board may be different from each other.

One above the other, from top to bottom, FIG. 2 shows a light emitting surfaces 10 of the light guide bodies 9, below which the frame 5 is shown. The printed circuit boards 7 are arranged underneath the frame 5.

The light guide bodies 9 and the printed circuit boards 7 each show corresponding hexagonal shapes. The light guide bodies 9 are inserted into openings 17 of the individual printed circuit boards 7.

In FIG. 2 each light guide body 9 carries one light emitting surface 10, respectively. Each light guide body 9 has a hexagonal shape.

FIG. 2 shows a set of four printed circuit boards 7 and four light guide bodies 9. Each individual printed circuit board 7 has a hexagonal shape.

Between the light guide bodies 9 and the printed circuit boards 7 shown in FIG. 2, a frame 5 is arranged.

In the embodiment of the invention shown in FIG. 2, the frame 5 is arranged to generate e.g. dark fields or shadows in the light scenario of the lighting assembly 1.

Additionally, in FIG. 2 the frame 5 can be used to separate the light 19 emitted by the light source 8; 12, with the frame 5 being arranged at positions in relation to the light sources 8; 12 (not shown). Also, the frame 5 may limit the leading of the emitted light 19.

To interact with the light guide body 9 and/or the printed circuit board 7, the frame 5 also has a hexagonal shape.

FIG. 2 shows four individual printed circuit boards 7 that are adjacent and connected to each other.

In the center of each individual printed circuit board 7 there is an opening 17, respectively.

The opening 17 of each individual printed circuit board 7 is designed to receive at least one light guide body 9.

The light guide body 9 and the individual printed circuit board 7 each have corresponding hexagonal shapes, for receiving the light guide body 9 in the opening 17 of the individual printed circuit board 7.

In FIG. 2 the printed circuit board 7 is designed to run around the light guide body 9.

The individual printed circuit board 7 shown in FIG. 2 each shows a light source 8; 12. Each light source 8; 12 is fitted into a corner of the printed circuit board 7, wherein the printed circuit board 7 has a hexagonal shape.

In FIG. 2 the light emitted by the light source 8; 12 into the light guide body 9 is symbolized by reference 19, extending at an angle relative to the light body 9 and/or the frame 5 and/or the printed circuit board 7.

Figure 3:
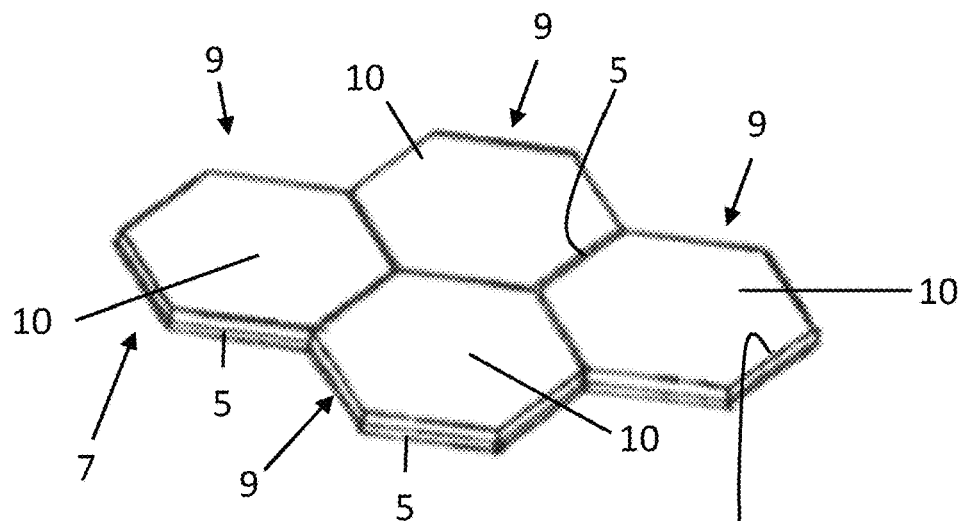
FIG. 3 shows the individual components of the backlighting device according to FIG. 2 in an assembled state.

FIG. 3 shows a backlighting device 6 comprising the components frame 5, printed circuit boards 7, light sources 8; 12 (not shown) and light guide bodies 9. Each light guide body 9 has a light emitting surface 10.

In FIG. 3, the backlighting device 6 is shown in an assembled state. On the top of the backlighting device 6 shown in FIG. 3, the light guide bodies 9 can be seen, which have hexagonal shapes.

Figure 4:
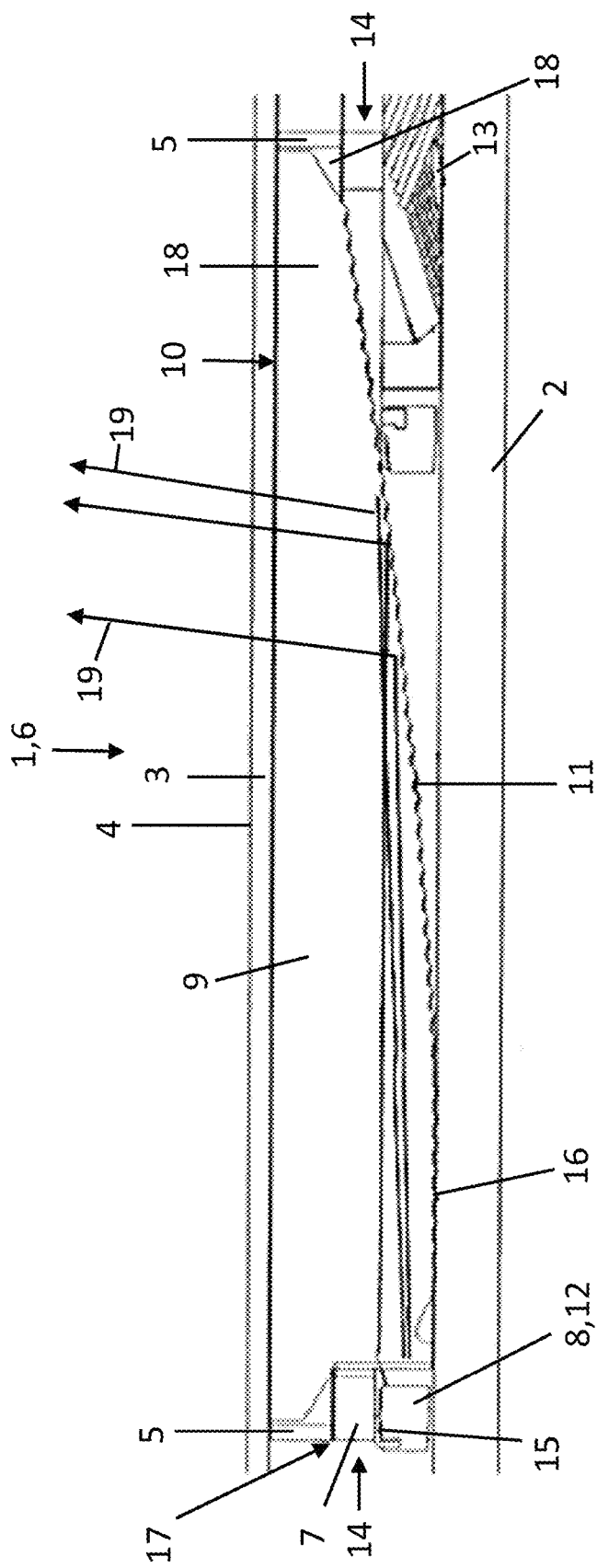
FIG. 4 shows a backlighting device according to one embodiment of the invention cut from the side.

FIG. 4 shows a side view of an assembly of a backlighting device 6 of a lighting assembly 1 according to one embodiment of the invention.

The assembly has a casing 2. The casing 2 may house electrical and/or electronic components necessary within the backlighting device 6.

The printed circuit board 7 is shown in a center 14 of the casing 2.

In FIG. 4, the light source 8, preferably the LED 12, is arranged on the bottom of the printed circuit board 7.

Due the position of the light source 8,12 relative to the printed circuit board 7, the printed circuit board 7 acts like a shielding element 15.

In FIG. 4 the shielding element 15 in form of the printed circuit board 7 blocks the light 19 emitted by the light source 8,12 from being spreaded upwards towards the light emitting surface 10 of the light guide body 9 and/or towards the diffuser foil 3 and/or towards the front panel 4.

The light 19 emitted by the light source 8; 12 is directed sideways inside the casing 2 by the printed circuit board 7 acting as the shielding element 15. The light is directed from the light source 8; 12 into the light guide body 9.

In FIG. 4, in the light guide body 9, the light 19 emitted by the light source 8; 12 is directed upwards towards the diffuser foil 3 and/or towards the front panel 4 and/or towards the light emitting surface 10.

In other words, the printed circuit board 7 acts like a shielding element. Working as the shielding element the circuit board 7 blocks in a preferably perpendicular emission of the light 19 emitted by the light source 8,12 in the direction from the printed circuit board 7. Instead, the printed circuit board 7 blocks the emitted light, so that the emitted light 19 is laterally deflected into the light guide body 9.

In the light guide body 9, at least one geometric structure 11 is arranged. The geometric structure 11 is referred to in more detail in the general description of the invention.

The geometric structure 11 redirects the light 19 emitted by the light source 8,12 from the lateral direction back into a prefereably substantially perpendicular direction relative to the light source 8,12.

In FIG. 4, inside the light guide body 9, the at least one geometric structure 11 of the light guide body 9 redirects the emitted light 19. The geometric structure 11 redirects the light 19 in a direction extending from the geometric structure 11, preferably substantially perpendicularly, towards the light emitting surface 10 of the light guide body 9.

The printed circuit board 7 shown in FIG. 4 has one opening 17 to receive the light guide body 9.

Depending on the form of the light guide body 9, the opening 17 may have a round shape or a polygonal shape. It can also have a hexagonal shape (not shown). In principle, the opening 17 of the printed circuit board 7 can take any geometric shape to receive the corresponding geometric shape of the light guide body 9.

At the left side of the illustration shown in FIG. 4, the light guide body 9 shows an overlapping area 18, overlapping the printed circuit board 7. At the opposite side another overlapping area 18 of the light guide body 9 is shown in FIG. 4.

By means of the overlapping areas 18 two adjacent light guide bodies 9 of adjacent printed circuit boards 7 can be combined with each other.

The overlapping area 18 of the light guide body 9 illuminates a segment 16 of a printed ciruit board 7 extending between two adjacent light guide bodies 9. Generally speaking, overlapping areas 18 of the light guide bodies 9 can bridge and illuminate distances between two or more light guide bodies 9.

In the embodiment of the invention shown in FIG. 4, unilluminated areas or barely illuminated areas arranged between the light guide bodies 9 are illuminated by overlapping areas 18 of the light guide bodies 9.

At least two light guide bodies 9 are connected to each other by at least one web (not shown). The web may also be covered by the overlapping area 18 of the light guide body 9. The web is referred to in more detail in the general description of the invention.

The light 19 emitted by the light source 8 travels from one light guide body 9 to the neighbouring light guide body 9 via a web (not shown).

The web may be manufactured of a transparent material such as a silicone.

The embodiment shown in FIG. 4 comprises a frame 5, arranged above the printed circuit board 7, wherein the printed circuit board 7 is arranged above the light source 8; 12.

In FIG. 4 the casing 2 of the lighting assembly 1 houses the light source 8; 12 and the printed circuit board 7. Also, there is the frame 5 and the light guide body 9 arranged in the interior of the casing 2.

In the embodiment of the invention shown in FIG. 4 the light guide body 9 rests on a bottom 13 of the casing 2. Other embodiments are possible, where the light guide body rests on other components of the backlighting device, for example on the printed circuit board.

On the side of the casing 2, facing away from the bottom 13 of the casing 2, the casing 2 is covered by a diffuser foil 3 arranged on the front panel 4.

In the example of FIG. 4 a light source 8,12 rests on the bottom 13 of the casing 2. The light source 8,12 is arranged adjacent to the light guide body 9.

In FIG. 4 the light source 8,12 is designed as a so-called side LED 12.

The LED 12 is arranged on the bottom of the casing 2 next to the light guide body 9. Above the light source 8 (in this case the LED 12) the printed circuit board 7 is arranged.

The emitted light 19 is emitted by the LED 12. In FIG. 4 the printed circuit board 7 is arranged above the LED 12. Thus, the printed circuit board 7 blocks the light 19 emitted by the LED 12, from spreading preferably vertically upwards. The printed circuit board 7 blocks the emttited light 9 so that the emitted light 19 is guided to the side and transfers it to the light guide body 9, as shown in FIG. 4.

In FIG. 4, inside the light guide body 9, the geometric structure 11 redirects the emitted light 19 in a direction which, starting from the geometric structure 11, extends approximately vertically upwards towards the light emitting surface 10 of the light guide body 9.

Figure 5:
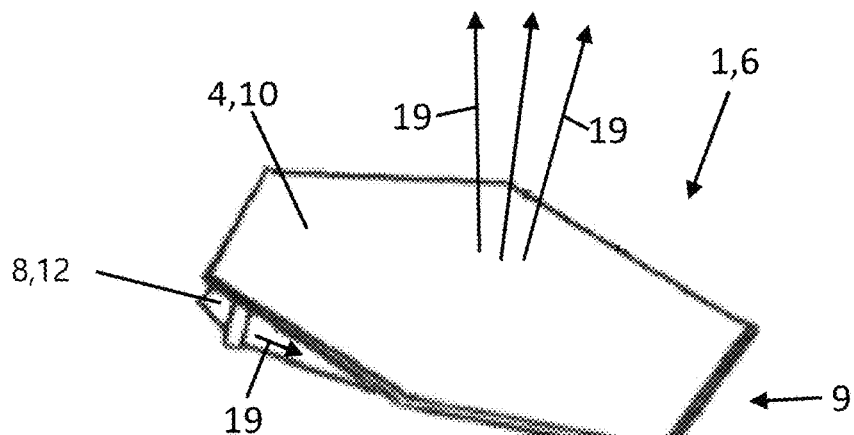
FIG. 5 shows an embodiment of a light guide body according to the invention having an elongated hexagonal shape and FIG. 6 shows an embodiment according to the invention with a light guide body having an hexagonal shape with equal edge lengths.

FIG. 5 shows an embodiment of the light guide body 9 having an elongated hexagonal shape.

In FIG. 5, the light guide body 9 is arranged between the light source 8; 12 and a front panel 4.

The light 19, emitted by the light source 8; 12, is coupled into the light guide body 9. Within the light guide body 9 the light 19 is redirected by the geometric structure 11 (not shown) of the light guide body 9.

After being redirected, the light 19, is emitted out through the front panel 4 of the backlighting device 6 via the light emitting surface 10 of the light guide body 9.

Figure 6:
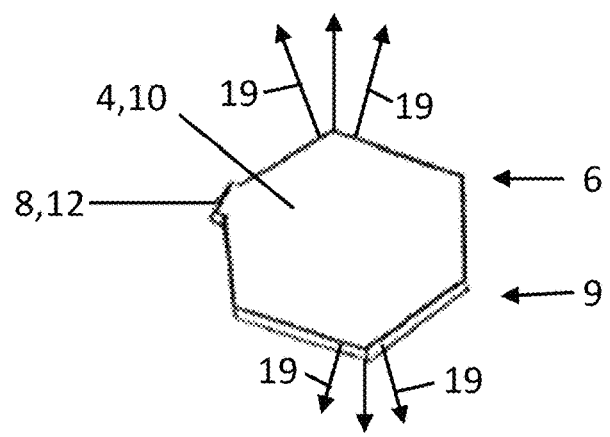

FIG. 6 is comparable to FIG. 5 with the difference that in FIG. 6 a light guide body 9 is shown, having a hexagonal shape with equal side lengths.

The embodiment shown in FIG. 6 otherwise corresponds to that of FIG. 5.

LIST OF REFERENCE

1 Lighting assembly
2 Casing
3 Diffuser foil
4 Front panel
5 Frame
6 Backlighting device
7 Printed circuit board
8 Light source
9 Light guide body
10 Light emitting surface
11 Geometric structure
12 LED
13 Bottom of casing
14 Centre of casing
15 Shielding element
16 Segment
17 Opening
18 Overlapping area
19 Emitted light

The invention claimed is:

1. A backlighting device for a lighting assembly of a vehicle, comprising:
   at least one printed circuit board; and
   at least one light guide body adapted and configured for receiving light emitted by a light source;

wherein the printed circuit board is arranged to block and deflect the light emitted by the light source and guide the light emitted by the light source to the first light guide body;

wherein the printed circuit board has at least one opening to receive the at least one light guide body; and a second light guide body interconnected with the at least one light guide body;

wherein the connection between the at least one and second light guide bodies is provided by at least one web or by means of at least one thin skin.

2. A backlighting device according to claim 1, wherein the light source is a LED.

3. A backlighting device according to claim 1 further comprising a diffusor foil arranged on the surface of the backlighting device.

4. A backlighting device according to claim 1 further comprising a casing in which the backlighting device is positioned.

5. A backlighting device according to claim 1 wherein the at least one light guide body includes a light emitting surface.

6. A backlighting device according to claim 1 wherein the printed circuit board comprises a frame of the backlighting device.

7. A backlighting device according to claim 1, further comprising at least one light source arranged underneath the printed circuit board.

8. A backlighting device according to claim 1 further comprising at least one light source that is a side light source.

9. A backlighting device according to claim 1, further comprising at least one light source that is a top light source.

10. A backlighting device according to claim 1 wherein the at least one light guide body has a polygonal shape.

11. A backlighting device according to claim 1, wherein the light guide body has a substantially circular or elliptical shape.

12. A backlighting device according to claim 1 wherein the at least one light guide body provides at least one overlapping area;

wherein the overlapping area illuminates unlit areas.

13. A backlighting device according to claim 1 wherein the at least one light guide body provides at least one geometric structure;

wherein the geometric structure redirects the emitted light.

14. A backlighting device according to claim 1 wherein the at least one printed circuit board has a polygonal shape.

15. A backlighting device according to claim 1, wherein the at least one printed circuit board has a substantially circular or elliptical shape.

16. A backlighting device according to claim 1, wherein the printed circuit board has the shape of a honeycomb.

17. A backlighting device according to claim 1, wherein the at least one circuit board comprises at least two circuit boards;

wherein the at least two printed circuit boards are linked together.

18. A backlighting device according to claim 17, wherein the at least two printed circuit boards have the shape of a honeycomb.

19. A backlighting device according to claim 1, further comprising at least one frame arranged in a manner to separate the at least one light guide body from the second light guide body.

20. A backlighting device according to claim 1 wherein the opening of the at least one printed circuit board has a shape which corresponds to a shape of the at least one light guide body.

21. A backlighting device according to claim 1 wherein the at least one printed circuit board and the at least one light guide body have different shapes.

22. A backlighting device according to claim 1 wherein the at least one light guide body precludes an overlapping area.

* * * * *